(12) United States Patent
Takahashi et al.

(10) Patent No.: US 10,087,265 B2
(45) Date of Patent: Oct. 2, 2018

(54) METHOD FOR PRODUCING DIMETHYL POLYVINYLPHOSPHONATE AND POLYVINYLPHOSPHONIC ACID

(71) Applicant: MARUZEN PETROCHEMICAL CO., LTD., Chou-ku (JP)

(72) Inventors: Takashi Takahashi, Chiba (JP); Keisuke Matsushita, Chiba (JP); Masaki Sugiyama, Chiba (JP); Norihiro Yoshida, Chiba (JP); Eiichi Ikawa, Chiba (JP); Takahito Mita, Chiba (JP); Masahiro Endo, Chiba (JP)

(73) Assignee: Maruzen Petrochemical Co., Ltd., Chuo-ku (JP)

( * ) Notice: Subject to any disclaimer, the term of this patent is extended or adjusted under 35 U.S.C. 154(b) by 0 days.

(21) Appl. No.: 15/315,588

(22) PCT Filed: Jun. 1, 2015

(86) PCT No.: PCT/JP2015/065721
§ 371 (c)(1),
(2) Date: Dec. 1, 2016

(87) PCT Pub. No.: WO2015/186649
PCT Pub. Date: Dec. 10, 2015

(65) Prior Publication Data
US 2017/0198073 A1   Jul. 13, 2017

(30) Foreign Application Priority Data

Jun. 3, 2014   (JP) .................................. 2014-114975

(51) Int. Cl.
*C08F 8/12* (2006.01)
*C08F 130/02* (2006.01)
(52) U.S. Cl.
CPC .............. *C08F 130/02* (2013.01); *C08F 8/12* (2013.01)
(58) Field of Classification Search
None
See application file for complete search history.

(56) References Cited

U.S. PATENT DOCUMENTS

| | | | | |
|---|---|---|---|---|
| 6,350,723 | B1 * | 2/2002 | Mishra ................. | C10M 145/14 508/472 |
| 2002/0004607 | A1 * | 1/2002 | Henkelmann ......... | C07F 9/3826 558/214 |
| 2002/0077494 | A1 | 6/2002 | Henkelmann et al. | |
| 2014/0113982 | A1 * | 4/2014 | Bigarre .................. | H01B 1/122 521/31 |

FOREIGN PATENT DOCUMENTS

| JP | 4-15208 A | 1/1992 |
|---|---|---|
| JP | 2002-179691 A | 6/2002 |

OTHER PUBLICATIONS

Kawauchi, Journal of Polymer Science: Part A: Polymer Chemistry, vol. 48, p. 1677-1682 (2010) (Year: 2010).*
Wagner, Macromolecular Chemistry and Physics, (2009) vol. 210, p. 1903-1914 (Year: 2009).*
Santos, Journal of Applied Polymer Science, vol. 119, p. 460-471 (2011). (Year: 2011).*
Wagner, Macromol. Chem. Phys., 2009, 210 p. 1903-1914. (Year: 2009).*
Definition of Aliphatic (Year: 2018).*
International Search Report dated Aug. 4, 2015 in PCT/JP2015/065721 filed Jun. 1, 2015.
Kawauchi, Takehiro et al., "Preparation of Isotactic-Rich Poly(dimethyl vinylphosphonate) and Poly(vinylphosphonic acid) via the Anionic Polymerization of Dimethyl Vinylphosphonate," Journal of Polymer Science: Part A: Polymer Chemistry, vol. 48, Mar. 8, 2010, pp. 1677-1682.
Salzinger, Stephan et al., "Poly(vinylphosphonate)s Synthesized by Trivalent Cyclopentadienyl Lanthanide-Induced Group Transfer Polymerization," Macromolecules, vol. 44, Jul. 6, 2011, pp. 5920-5927.
Bingoel, Bahar et al., "Synthesis, Microstructure, and Acidity of Poly(vinylphosphonic acid)," Macromolecular Rapid Communications, vol. 27, 2006, pp. 1719-1724.
Extended European Search Report dated Nov. 30, 2017 in Patent Application No. 15803277.1, citing documents AX and AY therein, 5 pages.
Lavinia Macarie, et al. "Poly(vinylphosphonic acid) and its derivatives", Progress in Polymer Science, vol. 35, No. 8, XP027137342, 2010, pp. 1078-1092.
Ya. A. Levin, et al. "Radical Copolymerization of Monovinyl Derivatives of Phosphorus", Polymer Science U.S.S.R, vol. 17, No. 4, XP025444078, 1975, pp. 971-982.

* cited by examiner

*Primary Examiner* — Robert C Boyle
(74) *Attorney, Agent, or Firm* — Oblon, McClelland, Maier & Neustadt, L.L.P.

(57) ABSTRACT

A method for producing poly(dimethyl vinylphosphonate) from a monomer component mainly containing dimethyl vinylphosphonate by anionic polymerization in the presence of an anionic polymerization initiator, the method being characterized in that an aliphatic ether is used as a polymerization solvent, and a method for producing poly(vinylphosphonic acid) characterized in that the poly(dimethyl vinylphosphonate) obtained by the former method is hydrolyzed in the presence of an acid are provided. The methods make it possible to easily produce a poly(dimethyl vinylphosphonate) which has a high molecular weight and in which the molecular weight is controlled, and make it possible to produce a poly(vinylphosphonic acid) which has a high molecular weight and in which the molecular weight is controlled corresponding to the poly(dimethyl vinylphosphonate).

20 Claims, 2 Drawing Sheets

METHOD FOR PRODUCING DIMETHYL POLYVINYLPHOSPHONATE AND POLYVINYLPHOSPHONIC ACID

TECHNICAL FIELD

The present invention relates to a method for producing poly(dimethyl vinylphosphonate) and a method for producing poly(vinylphosphonic acid) in which the poly(dimethyl vinylphosphonate) obtained by the former method is hydrolyzed.

BACKGROUND ART

Poly(vinylphosphonic acid ester) such as poly(dimethyl vinylphosphonate) and poly(vinylphosphonic acid) are being developed as a polymer electrolyte material for fuel cell, a halogen free frame retardant, a metal surface treatment agent, a biocompatible material, a food packaging material, and the like, and analysis of the polymer structure and studies of the polymerization method are actively being conducted.

Poly(vinylphosphonic acid) is, for example, obtained by radical polymerization of vinylphosphonic acid, and it is reported that poly(vinylphosphonic acid) obtained by radical polymerization of vinylphosphonic acid has a large proportion of head-to-head or tail-to-tail linkages and shows low positional regularity (NPL 1).

On the other hand, poly(vinylphosphonic acid) can also be obtained by hydrolyzing in the presence of an acid a poly(vinylphosphonic acid diester) obtained by radical polymerization of a vinylphosphonic acid diester. The poly(vinylphosphonic acid) obtained by the hydrolysis has a large proportion of head-to-tail linkage, and shows higher positional regularity than one obtained by radical polymerization of vinylphosphonic acid (the same as above).

However, in the radical polymerization of a vinylphosphonic acid diester, chain transfer to a phosphorus atom to which alkoxy binds occurs, and therefore molecular weights of the poly(vinylphosphonic acid diester) and the poly(vinylphosphonic acid) obtained by hydrolysis thereof have not been able to be increased.

As a method for obtaining a poly(vinylphosphonic acid diester) having a larger molecular weight, anionic polymerization is used (NPL 2). It is reported that, in the anionic polymerization, a poly(vinylphosphonic acid diester) having a larger molecular weight can be obtained, and in addition, stereoregularity of a poly(vinylphosphonic acid) obtained by hydrolyzing the obtained poly(vinylphosphonic acid diester) is higher compared to one obtained by hydrolyzing the radical polymerization product, and that thermal behavior and solubilities in solvents are also different (the same as above).

Furthermore, as a method capable of controlling the molecular weight, a group transfer polymerization method (GTP) is reported in which a tricyclopentadienyl lanthanoid complex is used as an initiator (NPL 3). This GTP is one of living anionic polymerization methods, and is capable of controlling the molecular weight with the ratio of the monomer and the initiator and obtaining a polymer having a higher molecular weight and lower dispersion.

Incidentally, as the vinylphosphonic acid diester which is a raw material monomer in the poly(vinylphosphonic acid diester) production, dimethyl ester, diethyl ester, diisopropyl ester, and the like are used. Among them, dimethyl ester has a high solubility in water and is suitable for hydrolysis in an aqueous solution. Dimethyl ester is advantageous also in terms of high industrial availability.

However, in the anionic polymerization and GTP, when dimethyl vinylphosphonate is used as a raw material monomer, the produced polymer has low solubility so that the yield of the polymerization is not enhanced, and the molecular weight cannot be increased and also cannot be controlled (NPL 2 and 3 above). Thus, the molecular weights (weight average molecular weights; Mw) of all the polymers produced using dimethyl vinylphosphonate as a monomer have been 50,000 or less, and a poly(dimethyl vinylphosphonate) having a high molecular weight of 60,000 or more has not been obtained, whereby the use thereof is limited. As a result of the above, moreover, all the poly(vinylphosphonic acid)s obtained by hydrolyzing the poly(dimethyl vinylphosphonate) have also had a low molecular weight.

On the other hand, poly(diisopropyl vinylphosphonate) produced by using diisopropyl vinylphosphonate as a monomer, and the like, has low aqueous solubility, and for producing poly(vinylphosphonic acid) from this polymer, it is required to allow trimethylsilyl bromide to react therewith in dichloromethane to convert the ester group to a trimethylsilyl ester and then hydrolyze the resultant in the presence of an acid, and the direct hydrolysis in an aqueous solution has been difficult (NPL 3 above).

CITATION LIST

Non-Patent Literature

NPL 1: Macromol. Rapid Commun. 2006, 27, 1719-1724
NPL 2: J Polym Sci Part A: Polym Chem 48, 1677-1682, 2010
NPL 3: Macromolecules, 2011, 44(15), 5920-5927

SUMMARY OF INVENTION

Technical Problem

The present invention has been made in view of the above circumstances, and one object thereof is to provide a method for producing a poly(dimethyl vinylphosphonate) having a high molecular weight of 60,000 or more in an easy manner.

Another object of the present invention is to provide a method for producing a poly(dimethyl vinylphosphonate) including the foregoing high molecular weight poly(dimethyl vinylphosphonate) while controlling the molecular weight thereof.

Another object of the present invention is to provide a method for producing a poly(vinylphosphonic acid) in which a poly(dimethyl vinylphosphonate) including one which has a high molecular weight and in which the molecular weight is controlled is directly hydrolyzed.

Solution to Problem

As a result of intensive studies of a method for producing poly(dimethyl vinylphosphonate) by anionic polymerization, the present inventors have found that a high molecular weight poly(dimethylvinylphosphonate) having a molecular weight of 60,000 or more can be produced easily by using a specific solvent as a polymerization solvent, and also that the molecular weight can be controlled easily by controlling a content of a specific impurity and other conditions.

The present inventors have also found that by subjecting the thus obtained poly(dimethyl vinylphosphonate) to hydrolysis in the presence of an acid, a poly(vinylphosphonic acid) which has a high molecular weight and in which the molecular weight is controlled can be obtained easily.

The present invention is based on the above findings, and the first invention of the present invention provides a method for producing a poly(dimethyl vinylphosphonate) from a monomer component mainly containing dimethyl vinylphosphonate by anionic polymerization in the presence of an anionic polymerization initiator, characterized in that an aliphatic ether is used as a polymerization solvent.

In addition, the second invention of the present invention provides the method for producing poly(dimethyl vinylphosphonate) wherein a monomer component in which the content of dimethyl phosphite is adjusted is used as the monomer component.

Furthermore, the third invention of the present invention provides a method for producing poly(vinylphosphonic acid) wherein the poly(dimethyl vinylphosphonate) obtained by the method according to the first or second invention is hydrolyzed in the presence of an acid.

Moreover, the forth invention of the present invention provides a method for controlling a molecular weight of a produced poly(dimethyl vinylphosphonate), characterized in that in anionic polymerization of a monomer component mainly containing dimethyl vinylphosphonate, the amount of dimethyl phosphite contained in the monomer component is adjusted in a range of 0.01 to 5% by mass.

Advantageous Effects of Invention

According to the first invention of the present invention, a poly(dimethyl vinylphosphonate) having a weight average molecular weight of 60,000 or more, which has conventionally been difficult to produce, can be produced in an easy manner.

In addition, according to the second invention, a poly(dimethyl vinylphosphonate) in which the weight average molecular weight (Mw) is controlled, for example, in a range of 10,000 to 300,000 can be produced.

Furthermore, according to the third invention, a poly(vinylphosphonic acid) which has a high molecular weight and in which the molecular weight is controlled can be obtained by directly hydrolyzing a poly(dimethyl vinylphosphonate) which has a high molecular weight and in which the molecular weight is controlled.

Moreover, according to the fourth invention, it is possible to previously control a molecular weight of a poly(dimethyl vinylphosphonate) obtained by a anionic polymerization reaction.

DESCRIPTION OF EMBODIMENTS

Figure 1:
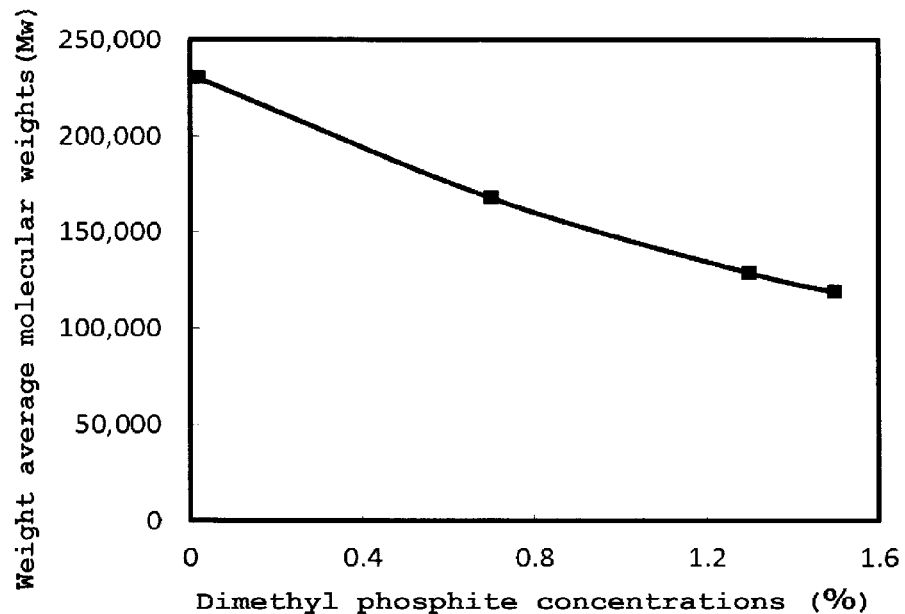
FIG. 1 is a graph showing the relation between the weight average molecular weights (Mw) and the dimethyl phosphite concentrations of poly(dimethyl vinylphosphonate)s obtained in Examples 1 and 2.

Hereinunder, suitable embodiments of the present invention are described in detail. The weight average molecular weights (Mw) and the molecular weight distributions (Mw/Mn) herein are values measured by gel permeation chromatography (GPC), and specifically means values measured by the method described in Examples.

(a) Production of poly(dimethyl vinylphosphonate)

The method for producing poly(dimethyl vinylphosphonate) of the present invention is a method for producing a poly(dimethyl vinylphosphonate) from a monomer component mainly containing dimethyl vinylphosphonate by anionic polymerization in the presence of an anionic polymerization initiator, characterized in that an aliphatic ether is used as a polymerization solvent.

The raw material compound for producing poly(dimethyl vinylphosphonate) is a monomer component mainly containing dimethyl vinylphosphonate. The monomer component means, not only a monomer component containing substantially only dimethyl vinylphosphonate, but also a monomer component containing impurities originated in dimethyl phosphite or other raw materials and non-polymerizable components such as a residual solvent as well as dimethyl vinylphosphonate. The monomer component is commercially available, for example, from Katayama Chemical Industries, Co., Ltd. as a commercial product, or can be obtained by known methods, for example, a method in which acetylene is reacted with dimethyl phosphite using a palladium complex or a nickel complex as a catalyst (for example, JP-A-2000-256381, JP-T-2001-518905, JP-A-2002-179691, JP-A-2004-075688, WO 2009/051025, etc.), or the like.

In the production method described above, examples of the aliphatic ether used as a polymerization solvent include aliphatic ethers having 2 to 10 carbon atoms such as diethyl ether, dipropyl ether, methyl tert-butyl ether (MTBE), ethyl tert-butyl ether (ETBE), dibutyl ether, diisoamyl ether, hexyl methyl ether, octyl methyl ether, cyclopenthyl methyl ether (CPME), and dicyclopentyl ether. Among them, in terms of solubilities of the monomer component and the polymerization initiator and the polymerization reactivity, MTBE is particularly preferred.

The amount of the solvent used in the anionic polymerization reaction is generally in a range of 100 to 2000 parts by weight, preferably 300 to 1000 parts by weight relative to 100 parts by weight of dimethyl vinylphosphonate as a monomer.

In the present invention, by using such a solvent, a high molecular weight poly(dimethyl vinylphosphonate) having a molecular weight of 60,000 or more, which has been conventionally difficult to produce in the case of using an aromatic compound such as toluene and a cyclic ether such as THF, can be synthesized easily by anionic polymerization. Of course, it is possible to obtain a poly(dimethylvinylphosphonate) having a molecular weight of 60,000 or less by the present invention method as described later.

The mode of the anionic polymerization in the present invention is not particularly limited, but a dropping polymerization method in which a monomer component solution containing dimethyl vinylphosphonate dissolved in the polymerization solvent is kept at a prescribed temperature and an initiator is added dropwise thereto is preferred. Furthermore, the anionic polymerization is preferably conducted under high vacuum or under an atmosphere of an inert gas such as nitrogen, argon and helium.

Examples of the initiator in the anionic polymerization include organic lithium compounds such as methyllithium, ethyllithium, n-butyllithium, sec-butyllithium, t-butyllithium, and hexyllithium; and basic organic metal compounds, for example, organic magnesium compounds (Grignard reagents) such as MeMgBr, EtMgBr, t-BuMgBr, t-BuMgCl, and PhMgBr. Among the initiators, an organic magnesium compound can be particularly suitably used. The amount of the initiator used is generally in a range of 0.0001 to 0.1 mol, preferably 0.001 to 0.05 mol relative to 1 mol of dimethyl vinylphosphonate.

The basic organic metal compound can be used in combination with a Lewis acid. Examples of the Lewis acid include organic aluminum compounds such as tri-t-butylaluminum, triisobutylaluminum, and trioctylaluminum. The amount of the Lewis acid used in combination, if used, is generally in a range of 1.0 to 50 mol, preferably 2.5 to 40 mol, relative to 1 mol of the basic organic metal compound.

Furthermore, the polymerization conditions in the anionic polymerization are not particularly limited, but the polymerization temperature is generally −80 to 100° C., preferably −20 to 60° C., more preferably 0 to 50° C. The polymerization time is generally 0.5 to 24 hours, preferably 1 to 12 hours, more preferably 1.5 to 6 hours. Incidentally, in the case where the polymerization is conducted while the initiator is added dropwise, it is preferred that the initiator is added dropwise over a period in a range of 1 to 4 hours and the mixture is aged for a period in a range of 0.5 to 1 hour.

In the anionic polymerization of the present invention, the polymerization reaction can be terminated in a stage where a polymerization product having an intended molecular weight is formed, by adding a polymerization terminator to the reaction mixture. As the polymerization terminator, for example, a protic compound such as water, methanol, isopropanol, acetic acid, and a methanol solution of hydrochloric acid can be used. The amount of the polymerization terminator used is not particularly limited, but generally the polymerization terminator is preferably used in a range of 1 to 100 mol relative to 1 mol of the used polymerization initiator.

After the polymerization reaction is terminated, the intended poly(vinylphosphonic acid diester) is separated and obtained from the reaction mixture. In the present invention method, since the poly(vinylphosphonic acid diester) after the polymerization is not dissolved in a solvent, the polymer can be easily collected by filtration. In addition, since the aliphatic ethers used as a polymerization solvent are not compatible with water, the poly(vinylphosphonic acid diester) can be collected as a polymer aqueous solution by bringing the polymerization liquid into contact with water to extract the polymer into the aqueous phase.

In the above method, the poly(dimethyl vinylphosphonate) can also be produced while controlling the molecular weight.

Specifically, in the anionic polymerization reaction, a monomer component mainly containing dimethyl vinylphosphonate (hereinunder, sometimes abbreviated as "monomer component") is used as a raw material, and by adjusting the content of dimethyl phosphite in the monomer component, it is possible to control the molecular weight of the produced poly(dimethyl vinylphosphonate).

In order to produce a poly(dimethyl vinylphosphonate) while controlling the molecular weight, for example, it is simply required that while experimentally testing the relation between the content of dimethyl phosphite in the monomer component as a raw material and the molecular weight of the obtained poly(dimethyl vinylphosphonate), the content of dimethyl phosphite in the raw material is appropriately adjusted, but preferably, a monomer component in which the content of dimethyl phosphite is adjusted in a range of 0.01 to 5% by mass is used.

Since dimethyl phosphite is generally contained in dimethyl vinylphosphonate as an impurity, the adjustment of dimethyl phosphite content in the monomer component is achieved by adding dimethyl phosphite or by removing dimethyl phosphate by distillation or other means.

The molecular weight of poly(dimethyl vinylphosphonate) obtained by this method increases as the amount of dimethyl phosphite contained in the monomer component decreases as shown in the examples described later. In addition, in the anionic polymerization, in general, as the temperature increases, chain transfer is more likely to occur, leading to reducing the molecular weight. Therefore, by controlling the dimethyl phosphite content at a prescribed polymerization temperature, the weight average molecular weight (Mw) of the poly(dimethyl vinylphosphonate) can be controlled approximately in a range of 10,000 to 300,000.

Accordingly, the weight average molecular weight (Mw) of the poly(dimethyl vinylphosphonate) obtained by the present invention method is arbitrary selected from the above range according to the intended use, but is preferably, in a range of 30,000 to 250,000, particularly preferably in a range of 60,000 to 200,000.

(b) Production of poly(vinylphosphonic acid)

In the present invention, by hydrolyzing the poly(dimethyl vinylphosphonate) in which the molecular weight is controlled obtained by the above method in the presence of an acid, a poly(vinylphosphonic acid) in which the molecular weight is controlled can be obtained.

As the poly(dimethyl vinylphosphonate), a polymer recovered as a solid from a polymerization liquid may be used, or a polymer aqueous solution obtained by bringing a polymerization liquid into contact with water to extract the poly(dimethyl vinylphosphonate) into the aqueous phase maybe used. It is preferred that the polymer aqueous solution obtained by water extraction is used to perform hydrolysis, since steps of filtration, drying, etc. are then not required, making it possible to simplifying the process.

As an acid used in the hydrolysis, an acid which is generally used in hydrolysis of a phosphoric acid ester may be used. Any of an inorganic acid, an organic acid, and a solid acid is usable, but in terms of the reactivity, an inorganic acid such as sulfuric acid, hydrochloric acid, and phosphoric acid is preferred, and hydrochloric acid is particularly preferred. The amount of the acid used is preferably an equal mol or more relative to 1 mol of the ester group of the poly(vinylphosphonic acid diester) used for the hydrolysis, generally in a range of 1 to 3 mol, preferably 1 to 2 mol, more preferably 1 to 1.5 mol.

The above-mentioned inorganic acid such as sulfuric acid, hydrochloric acid, and phosphoric acid is preferably used as an aqueous solution. In this case, the concentration of the acid is not particularly limited, but when hydrochloric acid is used as the acid, since the amount of the acid used can be reduced by reducing the proportion of water as a solvent, a conc. hydrochloric acid (12 mol/L) is preferably used.

The hydrolysis is generally performed in a solvent of water, a hydrophilic solvent, or a mixed solvent thereof. Examples of the hydrophilic solvent include polyhydric alcohols such as ethylene glycol, propylene glycol, and glycerin; glycol ether-based solvents such as cellosolve, methyl cellosolve, ethyl cellosolve, carbitol, methyl carbitol, ethyl carbitol, butyl carbitol, propylene glycol monomethyl ether, propylene glycol monomethyl ether, dipropylene glycol monomethyl ether, dipropylene glycol monoethyl ether, triethylene glycol monomethyl ether, and triethylene glycol monoethyl ether.

The amount of the solvent used is generally in a range of 100 to 1000 parts by weight, preferably 400 to 600 parts by weight, more preferably 300 to 500 parts by weight, relative to 100 parts by weight of poly(vinylphosphonic acid diester) used for the hydrolysis.

In the hydrolysis reaction, an antifoaming agent may be used to the extent that does not inhibit the reaction. As the antifoaming agent, in general, any known compound having a foam breaking effect or a foam suppressing effect maybe used. Specific examples include foam breaking polymer-type antifoaming agents such as an oil-type silicone antifoaming agent, an emulsion-type silicone antifoaming agent, and a nonionic polyether, a specific nonionic surfactant, a polyether-modified methylalkylpolysiloxane copolymer, a polyethylene glycol-type nonionic surfactant, and a vegetable oil-based antifoaming agent. The antifoaming agents may be used alone or in combination of two or more thereof. The amount of the antifoaming agent used is generally in a range of 0.001 to 1 parts by weight, preferably 0.01 to 0.1 parts by weight, relative to 100 parts by weight of the solvent.

The reaction temperature in the hydrolysis is not particularly limited, but generally selected from a range of 80 to 100° C., preferably 90 to 100° C., more preferably 95 to 100° C. of water. The reaction time may be appropriately selected depending on the reaction temperature, and is generally in a range of 2 to 24 hours, preferably 4 to 16 hours, more preferably 6 hours to 8 hours.

Furthermore, the hydrolysis reaction is preferably performed while removing methanol produced by the hydrolysis.

The weight average molecular weight (Mw) of poly(vinylphosphonic acid) obtained by the hydrolysis described above is in a range of 10,000 to 300,000, preferably 30,000 to 250,000, particularly preferably 60,000 to 200,000. Incidentally, the molecular weight of the poly(vinylphosphonic acid) obtained by the hydrolysis is theoretically reduced as compared with the polymer before hydrolysis due to elimination of a protecting group. However, in the weight average molecular weight (Mw) measured with GPC by the method described in Examples, the polymer after hydrolysis is measured as a higher molecular weight product than the polymer before hydrolysis due to an effect of interaction with the column. Accordingly, it is preferred that the anionic polymerization conditions are adjusted with taking the above fact into consideration so that the molecular weight of the polymer after hydrolysis is within a desired range.

The polymer solution after hydrolysis contains an excess amount of an acid, and therefore it is preferred that the acid is removed. For removing the acid, the polymer solution obtained by hydrolysis maybe treated as it is, or may be treated after dilution with water to an appropriate concentration.

The method for the acid removal treatment may be any method that can separate and remove the acid from the polymer solution. Specific examples include a reprecipitation method using a poor solvent of poly(vinylphosphonic acid), a adsorption treatment, an ultrafiltration method, a dialysis method, an electrodialysis method and an ion exchange membrane method, and one or a combination of two or more thereof are desirably used.

The poly(vinylphosphonic acid) after the acid removal treatment can be used as it is as a polymer solution, but may be used after being subjected to concentration, reprecipitation, solvent substitution, solvent extraction, drying, and the like, as needed.

EXAMPLES

The present invention is described below with reference to examples, but the technical idea of the present invention is not to be limited by the exemplification. In each example, composition analysis of a monomer component used as a polymerization raw material, and measurements of the molecular weight of the obtained polymer, the amount of remaining chloride ions, and the hydrolysis rate are performed according to the following methods. Unless otherwise specified, "%" is by weight.

<Composition Analysis>

Measurements of the dimethyl vinylphosphonate purity and the dimethyl phosphite content in a monomer component used as a polymerization raw material were performed by gas chromatography.

Gas chromatography apparatus: GC-2010, manufactured by Shimadzu Corporation
Column: DB-1
Measurement conditions: inlet 250° C., detector 280° C.
The column oven kept at 100° C. for 3 minutes, raised at a rate of 15° C./min to 280° C., and kept at 280° C. for 20 minutes <Measurement of Molecular Weight>

The weight average molecular weight (Mw) and the molecular weight distribution (Mw/Mn) of each polymer obtained in the examples were measured by gel permeation chromatography (GPC), and calculated from a value converted using a standard polyethylene oxide sample.

GPC measurement apparatus: LC-Solution, manufactured by Shimadzu Corporation
Column: Shodex SB-805HQ, SB-804HQ
Precolumn: Shodex SB-G
Column temperature: 40° C.
Mobile phase: 0.2 M NaCl aqueous solution
Flow rate: 0.5 mL/min
Detector: RI detector <Chloride Ion Concentration>

The chloride ion concentration remaining in the polymer was quantified by an ion chromatograph method.

IC measurement apparatus: DIONEX ICS-2000
Column: AS17-C
Eluent: KOH
Detector: conductivity detector <Measurement of Hydrolysis Rate>

The hydrolysis rate was calculated from the integrated value of the peak due to the methoxy group of poly(dimethyl vinylphosphonate) measured by $^1$H-NMR.

NMR measurement apparatus: JEOL AL-400
Solvent: heavy water (deuterated water)

<Polymer Concentration>

The polymer concentration in an aqueous solution was determined by drying 0.5 mL of the aqueous solution on a dish at 120° C. under a reduced pressure for 2 hours, and measuring the weight of the residue.

Example 1

Production Example (1) of poly(dimethyl vinylphosphonate)

A glass container of 10 L volume was provided, adsorbed water in the container was removed by heat, and the container was further purged with nitrogen gas. In this container, 980 g of a monomer component (1) which was prepared to have a dimethyl vinylphosphonate purity of 99.8% (dimethyl phosphite content 0.02%) by distillation and 6444 g of methyl t-butyl ether (MTBE) were placed, and the inside of the reaction system was cooled to 0° C.

After cooling, 406 g of t-BuMgCl prepared into 0.25 mol/L with THF (0.12 mol as t-BuMgCl) was dropwise added over 1 hour while keeping the temperature inside the system at 0° C., thereby allowing the polymerization reaction to proceed. After the dropwise addition of the whole amount of t-BuMgCl, the mixture was aged for 30 minutes to complete conversion of dimethyl vinylphosphonate.

To the reaction liquid, 3.9 g (0.12 mol) of methanol was added and the mixture was stirred for 30 minutes to terminate the reaction. The polymer precipitated was collected by filtration, and dried under a reduced pressure to collect 959 g of solid poly(dimethyl vinylphosphonate) (yield 97.9%). The yield and GPC measurement result of the resulting poly(dimethyl vinylphosphonate) are shown in Table 1.

Example 2

Production Examples (2) to (4) of poly(dimethyl vinylphosphonate)

To the monomer component (1) used in Example 1, dimethyl phosphite was added to prepare each of a monomer component (2) with a purity of 99.1% (dimethyl phosphite content 0.7%), a monomer component (3) with a purity of 98.5% (dimethyl phosphite content 1.3%) and a monomer component (4) with a purity of 98.3% (dimethyl phosphite content 1.5%).

Poly(dimethyl vinylphosphonate)s were obtained by the same procedure as in Example 1, except for using the respective monomer components (2) to (4) and using an initiator (t-BuMgCl) and a terminator (methanol) of the quantities shown in Table 1 presented later (Production Examples (2) to (4)).

The yields and GPC measurement results of the resulting poly(dimethyl vinylphosphonate)s are shown in Table 1 presented later. In addition, the relation between the weight average molecular weights (Mw) and the dimethyl phosphite concentrations of poly(dimethyl vinylphosphonate) s obtained in Examples 1 and 2 is shown in FIG. 1.

Example 3

Production Examples (5) to (8) of poly(dimethyl vinylphosphonate)

A crude dimethyl vinylphosphonate with a purity of 83.5% (containing dimethyl phosphite 3.1%, toluene 13.1%, methanol 0.2%, and others 0.1%) was distilled to prepare each of a monomer component (5) with a purity of 99.7% (dimethyl phosphite content 0.040), a monomer component (6) with a purity of 99.3% (dimethyl phosphite content 0.32%), a monomer component (7) with a purity of 98.9% (dimethyl phosphite content 0.64%), and a monomer component (8) with a purity of 98.6% (dimethyl phosphite content 0.96%).

A glass container of 500 mL volume was provided, adsorbed water in the container was removed by heat, and the container was further purged with nitrogen gas. In this container, 40.0 g of the monomer component (5) and 245.7 g of methyl t-butyl ether (MTBE) were placed, and the inside of the reaction system was cooled to 0° C.

After cooling, 31.8 g of t-BuMgCl prepared into 0.25 mol/L with THF (8.9 mmol as t-BuMgCl) was dropwise added over 1 hour while keeping the temperature inside the system at 0° C., thereby allowing the polymerization reaction to proceed. After the dropwise addition of the whole amount of t-BuMgCl, the mixture was aged for 30 minutes to complete conversion of dimethyl vinylphosphonate.

To the reaction liquid, 0.29 g (9.1 mmol) of methanol was added and the mixture was stirred for 30 minutes to terminate the reaction. The polymer precipitated was collected by filtration, and dried under a reduced pressure to collect 38.9 g of solid poly(dimethyl vinylphosphonate) (yield 97.3%; Production Example (5)).

Also for the monomer components (6) to (8), poly(dimethyl vinylphosphonate) s were obtained by the same procedure (Production Examples (6) to (8)). The yields and GPC measurement results of the resulting poly(dimethyl vinylphosphonate)s are shown in Table 1 presented later.

Example 4

Production Examples (9) to (12) of poly(dimethyl vinylphosphonate)

Poly(dimethyl vinylphosphonate)s were obtained by the same procedure as in Example 3 except that a polymerization reaction was conducted at a temperature inside the reaction system of 25° C. (Production Examples (9) to (12)). The yields and GPC measurement results of the resulting poly(dimethyl vinylphosphonate)s are shown in Table 1 presented later.

Example 5

Production Examples (13) to (16) of poly(dimethyl vinylphosphonate)

Poly(dimethyl vinylphosphonate)s were obtained by the same procedure as in Example 3 except that a polymerization reaction was conducted at a temperature inside the reaction system of 50° C. (Production Examples (13) to (16)).

Figure 2:
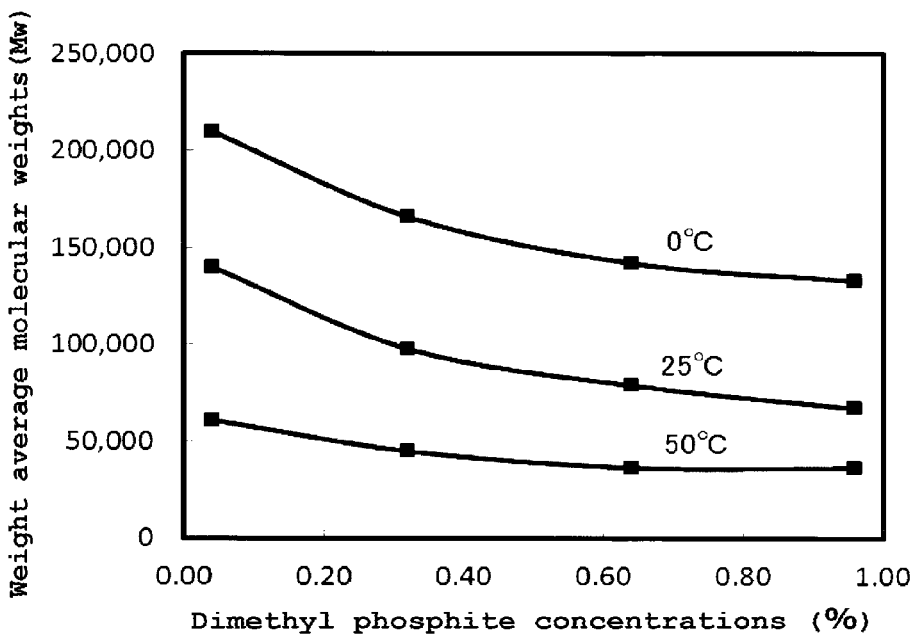
FIG. 2 is a graph showing the relation between the weight average molecular weights (Mw) and the dimethyl phosphite concentrations of poly(dimethyl vinylphosphonate)s obtained in Examples 3, 4 and 5.

The yields and GPC measurement results of the resulting poly(dimethyl vinylphosphonate)s are shown in Table 1 presented later. In addition, the relation between the weight average molecular weights (Mw) and the dimethyl phosphite concentrations of the poly(dimethyl vinylphosphonate)s obtained in Examples 3 to 5 is shown in FIG. 2.

Example 6

Production Examples (17) to (20) of poly(dimethyl vinylphosphonate)

To the monomer component (1) used in Example 1, dimethyl phosphite was added to prepare each of a monomer component (17) with a purity of 98.9% (dimethyl phosphite content 0.9%), a monomer component (18) with a purity of 98.3% (dimethyl phosphite content 1.5%), a monomer component (19) with a purity of 96.3% (dimethyl phosphite content 3.5%), and a monomer component (20) with a purity of 95.1% (dimethyl phosphite content 4.7%).

Poly(dimethyl vinylphosphonate)s were obtained by the same procedure as in Example 3, except for using the respective monomer components and using an initiator (t-BuMgCl) and a terminator (methanol) of the quantities shown in Table 1 (Production Examples (17) to (20)).

Figure 3:
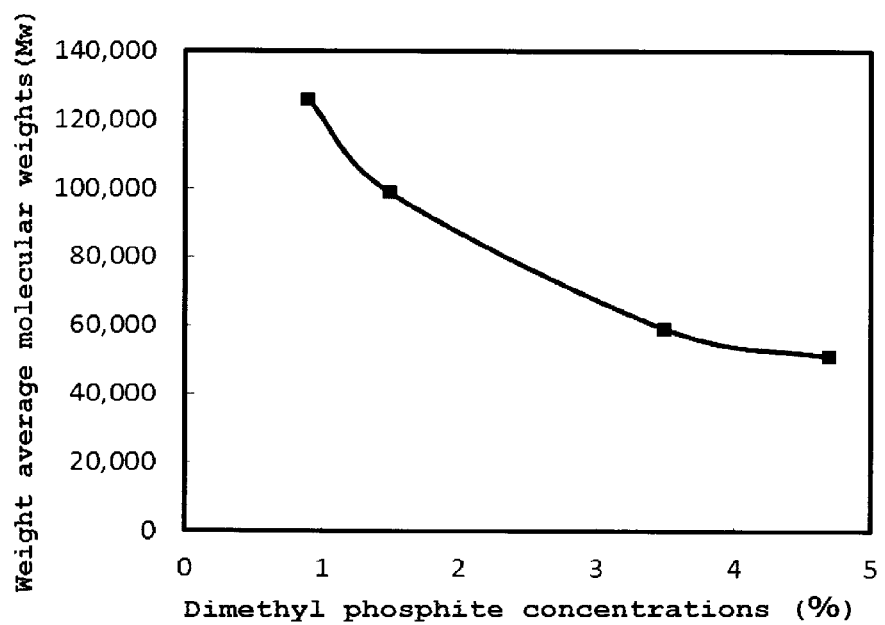
FIG. 3 is a graph showing the relation between the weight average molecular weights (Mw) and the dimethyl phosphite concentrations of poly(dimethyl vinylphosphonate)s obtained in Example 6.

The yields and GPC measurement results of the resulting poly(dimethyl vinylphosphonate) s are shown in Table 1. In addition, the relation between the weight average molecular weights (Mw) and the dimethyl phosphite concentrations of poly(dimethyl vinylphosphonate) s obtained in Example 6 is shown in FIG. 3.

TABLE 1

| | | Monomer component | | | | | | GPC measurement | |
|---|---|---|---|---|---|---|---|---|---|---|---|
| | | | Dimethyl | | | | Meth- | Reaction | Amount | result | |
| | | Purity % | phosphite % | g | MTBE g | t-BuMgCl mmol | anol mmol | temperature ° C. | collected g | Yield % | Mw | Mw/Mn |
| Example 1 | Production Example (1) | 99.8 | 0.02 | 980 | 6444 | 120 | 124 | 0 | 959 | 97.9 | 240,000 | 6.49 |
| Example 2 | Production Example (2) | 99.1 | 0.7 | 980 | 6444 | 158 | 163 | 0 | 963 | 98.3 | 168,000 | 3.13 |
| | Production Example (3) | 98.5 | 1.3 | 980 | 6444 | 180 | 185 | 0 | 956 | 97.6 | 129,000 | 3.19 |
| | Production Example (4) | 98.3 | 1.5 | 980 | 6444 | 180 | 185 | 0 | 960 | 98.0 | 119,000 | 3.21 |
| Example 3 | Production Example (5) | 99.7 | 0.04 | 40 | 245.7 | 8.9 | 9.1 | 0 | 38.9 | 97.3 | 210,000 | 4.73 |
| | Production Example (6) | 99.3 | 0.32 | 40 | 245.7 | 8.9 | 9.1 | 0 | 38.8 | 97.0 | 166,000 | 4.49 |
| | Production Example (7) | 98.9 | 0.64 | 40 | 245.7 | 8.9 | 9.1 | 0 | 39.1 | 97.8 | 142,000 | 4.76 |
| | Production Example (8) | 98.6 | 0.96 | 40 | 245.7 | 8.9 | 9.1 | 0 | 38.9 | 97.3 | 133,000 | 4.15 |
| Example 4 | Production Example (9) | 99.7 | 0.04 | 40 | 245.7 | 8.9 | 9.1 | 25 | 37.6 | 94.0 | 140,000 | 5.06 |
| | Production Example (10) | 99.3 | 0.32 | 40 | 245.7 | 8.9 | 9.1 | 25 | 37.5 | 93.8 | 97,900 | 4.62 |
| | Production Example (11) | 98.9 | 0.64 | 40 | 245.7 | 8.9 | 9.1 | 25 | 37.2 | 93.0 | 79,000 | 4.60 |
| | Production Example (12) | 98.6 | 0.96 | 40 | 245.7 | 8.9 | 9.1 | 25 | 38.1 | 95.3 | 67,200 | 3.95 |
| Example 5 | Production Example (13) | 99.7 | 0.04 | 40 | 245.7 | 8.9 | 9.1 | 50 | 36.8 | 92.0 | 61,000 | 5.51 |
| | Production Example (14) | 99.3 | 0.32 | 40 | 245.7 | 8.9 | 9.1 | 50 | 36.4 | 91.0 | 45,000 | 3.68 |
| | Production Example (15) | 98.9 | 0.64 | 40 | 245.7 | 8.9 | 9.1 | 50 | 35.9 | 89.8 | 36,400 | 3.41 |
| | Production Example (16) | 98.6 | 0.96 | 40 | 245.7 | 8.9 | 9.1 | 50 | 36.6 | 91.5 | 36,300 | 3.24 |
| Example 6 | Production Example (17) | 98.9 | 0.9 | 40 | 245.7 | 6.1 | 6.3 | 0 | 39.1 | 97.8 | 126,000 | 3.55 |
| | Production Example (18) | 98.3 | 1.5 | 40 | 245.7 | 6.1 | 6.3 | 0 | 36.1 | 90.3 | 98,700 | 2.78 |
| | Production Example (19) | 96.3 | 3.5 | 40 | 245.7 | 7.8 | 8.0 | 0 | 36.5 | 91.3 | 59,200 | 2.49 |
| | Production Example (20) | 95.1 | 4.7 | 40 | 245.7 | 8.1 | 8.3 | 0 | 36.4 | 91.0 | 51,100 | 2.68 |
| Example 7 | Production Example (21) | 95.5 | 4.3 | 40 | 245.0 | 10.6 | 11.0 | 50 | 34.6 | 86.5 | 14,900 | 2.22 |

Example 7

Production Examples (21) of poly(dimethyl vinylphosphonate)

A glass container of 500 mL volume was provided, adsorbed water in the container was removed by heat, and the container was further purged with nitrogen gas. In this container, 40.0 g of the monomer component (19) prepared to have a dimethyl vinylphosphonate purity of 95.5% (dimethyl phosphite content 4.3%) and 245.0 g of methyl t-butyl ether (MTBE) were placed, and the inside of the reaction system was heated to 50° C.

37.5 g of t-BuMgCl prepared into 0.25 mol/L with THF (10.6 mmol as t-BuMgCl) was dropwise added over 1 hour while keeping the temperature inside the system at 50° C., thereby allowing the polymerization reaction to proceed. After the dropwise addition of the whole amount of t-BuMgCl, the mixture was aged for 30 minutes to complete conversion of dimethyl vinylphosphonate.

To the reaction liquid, 0.35 g (11.0 mmol) of methanol was added and the mixture was stirred for 30 minutes to terminate the reaction. The polymer precipitated was collected by filtration, and dried under a reduced pressure to collect 34.6 g of solid poly(dimethyl vinylphosphonate) (yield 86.5%).

The resulting poly(dimethyl vinylphosphonate) was found to have Mw=14,900 and Mw/Mn=2.22 from a result of GPC measurement, as shown in Table 1 above.

Example 8

Production Example and Hydrolysis Example (1) of poly(vinylphosphonic acid)

(1) A glass container of 500 mL volume was provided, adsorbed water in the container was removed by heat, and the container was further purged with nitrogen gas. In this container, 40.0 g of the same monomer component (18) with a purity of 98.3% (dimethyl phosphite content 1.5%) as used in Example 6 and 245.0 g of methyl t-butyl ether (MTBE) were placed, and the inside of the reaction system was cooled to 0° C.

After cooling, 30.5 g of PhMgBr prepared into 0.25 mol/L with THF (7.4 mmol as PhMgBr) was dropwise added over 1 hour while keeping the temperature inside the system at 0° C., thereby allowing the polymerization reaction to proceed. After the dropwise addition of the whole amount of PhMgBr, the mixture was aged for 30 minutes to complete conversion of dimethyl vinylphosphonate.

To the reaction liquid, 0.24 g (7.5 mmol) of methanol was added and the mixture was stirred for 30 minutes to terminate the reaction. The polymer precipitated was collected by filtration, and dried under a reduced pressure to collect 39.3 g of solid poly(dimethyl vinylphosphonate) (yield 98.3%).

The resulting poly(dimethyl vinylphosphonate) was found to have Mw=104,000 and Mw/Mn=3.16 from a result of GPC measurement.

(2) In a glass container with a volume of 500 mL, 30.0 g of poly(dimethyl vinylphosphonate) (0.22 mol in terms of dimethyl vinylphosphonate) obtained by the above-mentioned procedure (1), 72.0 g (4.00 mol) of deionized water, and 88.0 g of 12 mol/L hydrochloric acid (0.87 mol) were added, and allowed to react at 100° C. for 6 hours. During the reaction, methanol produced as a byproduct was removed using a Dean-Stark apparatus.

After completion of the reaction, as a result of confirmation by a $^1$H-NMR measurement, the hydrolysis rate of poly(dimethyl vinylphosphonate) was 100%. The reaction liquid was concentrated and dried, thereby obtaining 23.0 g of solid poly(vinylphosphonic acid) (yield 96.5%). The resulting poly(vinylphosphonic acid) was found to have Mw=138,000 and Mw/Mn=3.20 from a result of GPC measurement. In addition, the remaining chloride ion was found to be 2.7% based on the polymer from a result of chloride analysis.

Example 9

Production Example and Hydrolysis Example (2) of poly(vinylphosphonic acid)

(1) Production of poly(dimethyl vinylphosphonate)

A glass container of 500 mL volume was provided, adsorbed water in the container was removed by heat, and the container was further purged with nitrogen gas. In this container, 40.3 g of dimethyl vinylphosphonate and 246.2 g of methyl t-butyl ether were placed, and the inside of the reaction system was cooled to 0° C. After cooling, 27.0 g of t-BuMgCl prepared into 0.25 mol/L with THF (7.5 mmol as t-BuMgCl) was dropwise added over 1 hour while keeping the temperature inside the system at 0° C., thereby allowing the polymerization reaction to proceed. After the dropwise addition of the whole amount of t-BuMgCl, the mixture was aged for 30 minutes to complete conversion of dimethyl vinylphosphonate.

(2) Water Extraction Step

To the reaction liquid, 120.9 g of deionized water was added and stirred for 60 minutes to terminate the reaction. After completion of the stirring, the mixture was allowed to stand for 30 minutes to separate the organic phase and the aqueous phase, thereby collecting 167 g of an aqueous solution of poly(dimethyl vinylphosphonate).

The resulting poly(dimethyl vinylphosphonate) was found to have Mw=125,000 and Mw/Mn=4.40 from a result of GPC measurement. In addition, the aqueous solution had a polymer concentration of 24.5% by mass (40.9 g as solid; yield 102%).

(3) Hydrolysis Step

In a glass container with a volume of 500 mL, 124.9 g of the above poly(dimethyl vinylphosphonate) aqueous solution (30.6 g as solid; 0.22 mol in terms of dimethyl vinylphosphonate) was added, and concentrated at 100° C. until a poly(dimethyl vinylphosphonate) concentration of 30% was reached. To the concentrated liquid, 85.6 g of 12 mol/L hydrochloric acid (0.84 mol) was added to allow the mixture to react at 100° C. for 6 hours. During the reaction, methanol produced as a byproduct was removed using a Dean-Stark apparatus. After completion of the reaction, it is confirmed by $^1$H-NMR measurement that poly(dimethyl vinylphosphonate) was completely hydrolyzed.

(4) Acid Removal Step

To a reaction liquid obtained by the hydrolysis step, 283.4 g of methyl ethyl ketone was added to precipitate solid of poly(vinylphosphonic acid), and the solid was collected by filtration. The collected solid was dissolved in 157.9 g of deionized water, 70.0g of ion exchange resin (DOWER MONOSPHERE-550A, manufactured by The Dow Chemical Company, Trademark) was added and the mixture was stirred for 2 hours.

The resulting poly(vinylphosphonic acid) was found to have Mw=170,000, Mw/Mn=3.80 from a result of GPC measurement. The aqueous solution had a polymer concentration of 12.2% by mass (22.0 g as solid; yield 92%). In addition, the remaining chloride ion was found to be less than 1% based on the polymer from a result of chloride analysis.

Comparative Example 1

Production Example (22) of poly(dimethyl vinylphosphonate)

Comparative Example in the case where a solvent other than an aliphatic ether was used as a polymerization solvent is shown below. Specifically, a glass container with a volume of 500 mL was provided, adsorbed water in the container was removed by heat, and the container was further purged with nitrogen gas. In this container, the same monomer component (18) with a purity of 98.3% (dimethyl phosphite content 1.5%) as used in Example 6 and 266.7 g (2.89 mol) of toluene were placed, and the inside of the reaction system was cooled to 0° C.

After cooling, 30.5 g of PhMgBr prepared into 0.25 mol/L with THF (7.4 mmol as PhMgBr) was added dropwise over 1 hour while keeping the temperature inside the system at 0° C., thereby allowing the polymerization reaction to proceed. After the dropwise addition of the whole amount of PhMgBr, the mixture was aged for 30 minutes to complete conversion of dimethyl vinylphosphonate.

To the reaction liquid, 0.24 g (7.5 mmol) of methanol was added and stirred for 30 minutes to terminate the reaction. The polymer precipitated was collected by filtration, and dried under a reduced pressure to collect 24.4 g of solid poly(dimethyl vinylphosphonate) (yield 61.1%) The resulting poly(dimethyl vinylphosphonate) was found to have Mw=57,000 and Mw/Mn=1.91 from a result of GPC measurement.

INDUSTRIAL APPLICABILITY

According to the present invention, a poly(dimethyl vinylphosphonate) having a weight average molecular weight of 60,000 or more which has conventionally been difficult to produce can be produced in an easy manner, and furthermore, the molecular weight thereof can be controlled.

In addition, by directly hydrolyzing the poly(dimethyl vinylphosphonate) which has a high molecular weight and in which the molecular weight is controlled, a corresponding poly(vinylphosphonic acid) which has a high molecular weight and in which the molecular weight is controlled can be obtained.

Accordingly, the poly(dimethyl vinylphosphonate) and the poly(vinylphosphonic acid) are usable, as polymers having different physical properties from conventional products, for a polymer electrolyte material for fuel cell, a halogen free frame retardant, a metal surface treatment agent, a biocompatible material, and a food packaging material.

The invention claimed is:

1. A method for producing poly(dimethyl vinylphosphonate) from a monomer component comprising dimethyl vinylphosphonate and dimethyl phosphite, the method comprising:
    performing anionic polymerization of the dimethyl vinylphosphonate in the presence of an anionic polymerization initiator in a polymerization solvent, thereby producing poly(dimethyl vinyl phosphonate),
    wherein the polymerization solvent is an aliphatic ether.

2. The method according to claim 1, wherein the aliphatic ether has 2 to 10 carbon atoms.

3. The method according to claim 1, wherein an amount of the dimethyl phosphite in the monomer component is in a range of 0.01 to 5% by mass.

4. A method for producing poly(vinylphosphonic acid), comprising: producing poly(dimethyl vinyl phosphonate) by the method claim 1
    hydrolyzing the poly(dimethyl vinylphosphonate) in the presence of an acid.

5. The method according to claim 4, further comprising, prior to the hydrolyzing:

contacting a polymerization liquid obtained by the anionic polymerization with water to extract the poly(dimethyl vinylphosphonate) into an aqueous phase comprising an aqueous solution, wherein the aqueous solution is used to perform hydrolysis of the poly(dimethyl vinylphosphonate) in the hydrolyzing.

6. The method according to claim 1, wherein the aliphatic ether comprises at least one selected from the group consisting of diethyl ether, dipropyl ether, methyl tert-butyl ether (MTBE), ethyl tert-butyl ether (ETBE), dibutyl ether, diisoamyl ether, hexyl methyl ether, octyl methyl ether, cyclopentyl methyl ether (CPME), and dicyclopentyl ether.

7. The method according to claim 1, wherein the aliphatic ether comprises methyl tert-butyl ether (MTBE).

8. The method according to claim 1, wherein the anionic polymerization initiator comprises an organic lithium compound, a basic organic metal compound, or both.

9. The method according to claim 1, wherein the anionic polymerization initiator comprises at least one selected from the group consisting of methyllithium, ethyllithium, n-butyllithium, sec-butyllithium, t-butyllithium, hexyllithium, MeMgBr, EtMgBr, t-BuMgBr, t-BuMgCl, and PhMgBr.

10. The method according to claim 1, wherein an amount of the dimethyl phosphite in the monomer component is in a range of 0.02 to 4.7% by mass.

11. A method for producing poly(vinylphosphonic acid), comprising: producing poly(diemethyl vinyl phosphonate) by the method of claim 2 hydrolyzing the poly(dimethyl vinylphosphonate) in the presence of an acid.

12. The method according to claim 11, further comprising, prior to the hydrolyzing:

contacting a polymerization liquid obtained by the anionic polymerization with water to extract the poly(dimethyl vinylphosphonate) into an aqueous phase comprising an aqueous solution, wherein the aqueous solution is used to perform hydrolysis of the poly(dimethyl vinylphosphonate) in the hydrolyzing.

13. The method according to claim 1, wherein the anionic polymerization is performed for 0.5 to 24 hours.

14. The method according to claim 4, wherein the acid comprises at least one selected from the group consisting of sulfuric acid, hydrochloric acid, and phosphoric acid.

15. The method according to claim 1, wherein the poly (dimethyl vinylphosphonate) has a weight average molecular weight (Mw) of from 60,000 to 200,000.

16. The method according to claim 1, wherein an amount of the dimethyl phosphite in the monomer component is in a range of 0.04 to 4.3% by mass.

17. A method for controlling a molecular weight of a produced poly(dimethyl vinylphosphonate), comprising:

adjusting an amount of dimethyl phosphite in a monomer component comprising dimethyl vinylphosphonate to a range of 0.01 to 5% by mass in anionic polymerization of the monomer component.

18. The method according to claim 7, further comprising: adjusting the temperature to be within a range of 0° C. to 50° C. such that the anionic polymerization is performed at the temperature in the range of 0° C. to 50° C.

19. The method according to claim 17, wherein the anionic polymerization is performed for 0.5 to 24 hours.

20. The method according to claim 17, wherein in the adjusting, the amount of the dimethyl phosphite in the monomer component is adjusted to a range of 0.02 to 4.7% by mass.

* * * * *